United States Patent

Asao et al.

[11] Patent Number: 5,804,536
[45] Date of Patent: Sep. 8, 1998

[54] SOLID LUBRICANT FOR BEARINGS COMPRISING A MIXTURE CONTAINING A LUBRICATING GREASE AND POLYETHYLENE POWDER

[75] Inventors: Mitsunari Asao, Suzuka; Hidenobu Mikami, Kuwana, both of Japan

[73] Assignee: NTN Corporation, Osaka, Japan

[21] Appl. No.: 826,332

[22] Filed: Mar. 27, 1997

[30] Foreign Application Priority Data

Apr. 1, 1996 [JP] Japan .................................... 8-079021
Apr. 22, 1996 [JP] Japan .................................... 8-100093

[51] Int. Cl.$^6$ ................................................ C10M 123/04
[52] U.S. Cl. .................... 508/100; 508/390; 508/409; 508/418; 508/451; 508/485; 508/591
[58] Field of Search .................................... 508/100, 390, 508/418, 409, 451, 485, 516, 591

[56] References Cited

U.S. PATENT DOCUMENTS

| | | | |
|---|---|---|---|
| 2,764,548 | 9/1956 | King et al. | 508/390 |
| 2,810,695 | 10/1957 | Young et al. | 508/591 |
| 3,432,431 | 3/1969 | Mitacek | 508/591 |
| 3,541,011 | 11/1970 | Davis et al. | 508/100 |
| 3,547,819 | 12/1970 | Davis et al. | 508/591 |
| 3,729,415 | 4/1973 | Davis et al. | 508/591 |
| 4,357,249 | 11/1982 | Mellor | 508/100 |
| 5,435,925 | 7/1995 | Jamison | 508/591 |
| 5,462,684 | 10/1995 | Naka et al. | 508/485 |
| 5,656,582 | 8/1997 | Shiraishi et al. | 508/100 |

*Primary Examiner*—Jerry D. Johnson
*Attorney, Agent, or Firm*—Wenderoth, Lind & Ponack L.L.P.

[57] ABSTRACT

A solid lubricant for bearings which is less likely to be washed away by water or liquid mud coming into bearings, and which can restrain the development of rust even in a harsh environment where high-concentration salt water comes into the bearings. A rust preventive in the form of a sulfonate or a fatty polyhydric alcohol partial ester is added to a composition made up of 5-97% by weight of a lubricating grease, 93-1% by weight of an ultra-high-molecular-weight polyolefin powder, and 1-50% by weight of oil exudation inhibitor, and mixed together. The mixture is then heated to a temperature higher than the gel point of the ultra-high-molecular-weight polyolefin and preferably lower than the dropping point of the lubricating grease and molded into the solid lubricant for bearings.

6 Claims, No Drawings

SOLID LUBRICANT FOR BEARINGS COMPRISING A MIXTURE CONTAINING A LUBRICATING GREASE AND POLYETHYLENE POWDER

BACKGROUND OF THE INVENTION

This invention relates to a solid lubricant for use with water-resistant bearings.

Rolling bearings are ordinarily filled with a grease comprising a base oil such as a mineral oil, and thickeners such as lithium soap, aluminum soap or polyurea.

Water-resistant bearings, used in agricultural machinery and automobiles, are provided with sealing means such as seal rings to prevent entry of water into the bearings.

It is structurally difficult to completely seal grease in rolling bearings. Grease will thus leak out gradually with prolonged use of the bearings. Also, rainwater and muddy water will invade the bearings, causing gradual degradation of the grease.

In view of these problems, the inventors of the present invention proposed in examined Japanese patent publication 63-23239 a solid lubricant which is less likely to leak out of bearings. This lubricant comprises an ultra-high-molecular-weight polyethylene and a lubricating grease having a dropping point higher than the melting temperature of the polyethylene. It is charged in a bearing after heating it to a temperature higher than the melting temperature of the polyethylene and is allowed to solidify.

U.S. Pat. No. 3547819 discloses a solid lubricating composition for bearings comprising a hydrocarbon oil having lubricating properties and solidified by adding an ultra-high-molecular-weight polyethylene having an average molecular weight of $1.5 \times 10^6$ to $5 \times 10^6$.

Although these conventional solid lubricants for bearings are less likely to leak out of bearings, their lubricating properties tend to deteriorate quickly due to rust on the inner steel or other metal surface of the bearings, which is caused by water inevitably coming into the bearings.

One way to prevent rust is to add a rust preventive such as sodium nitrite. But even such a rust preventive cannot completely prevent rust if bearings (e.g. radial bearings) are used in a rather harsh environment in which the bearings are operated under a radial load of 10–100N and attacked by high-concentration (about 3%) salt water coming into the bearings.

An object of this invention is to provide a solid lubricant for bearings which is free of the above problems, which is less likely to be washed away by water or liquid mud coming into the bearings, and which can prevent rust in the bearings and thus maintain good lubricating properties of the bearings for a long period of time.

SUMMARY OF THE INVENTION

According to this invention, there is provided a solid lubricant for bearings comprising a mixture of 5-98% by weight of a lubricating grease, and 94-1% by weight of an ultra-high-molecular-weight polyolefin powder, and a rust preventive in the form of a sulfonate or a fatty polyhydric alcohol partial ester, the mixture being heated to a temperature higher than the gel point of the ultra-high-molecular-weight polyolefin and lower than the dropping point of the lubricating grease.

From another aspect of the invention, there is provided a solid lubricant for bearings comprising a mixture of 5-97% by weight of a lubricating grease, 93-1% by weight of an ultra-high-molecular-weight polyolefin powder, and 1-50% by weight of oil exudation inhibitor, and a rust preventive in the form of a sulfonate or a fatty polyhydric alcohol partial ester, the mixture being heated to a temperature higher than the gel point of the ultra-high-molecular-weight polyolefin and lower than the dropping point of the lubricating grease.

From another aspect of the invention, there is provided a solid lubricant for bearings comprising a mixture of 5-98% by weight of a lubricating oil, and 94-1% by weight of an ultra-high-molecular-weight polyolefin powder, and a rust preventive in the form of a sulfonate or a fatty polyhydric alcohol partial ester, the mixture being heated to a temperature higher than the gel point of the ultra-high-molecular-weight polyolefin.

From another aspect of the invention, there is provided a solid lubricant for bearings comprising a mixture of 5-97% by weight of a lubricating oil, 93-1% by weight of an ultra-high-molecular-weight polyolefin powder, and 1-50% by weight of oil exudation inhibitor, and a rust preventive in the form of a sulfonate or a fatty polyhydric alcohol partial ester, the mixture being heated to a temperature higher than the gel point of the ultra-high-molecular-weight polyolefin.

The ultra-high-molecular-weight polyolefin may be an ultra-high-molecular-weight polyolefin having an average molecular weight of $1 \times 10^6 - 5 \times 10^6$.

Since the solid lubricant for bearings according to this invention is solid, it is less likely to flow away together with water coming into bearings. Its oil content exudes gradually in a suitable amount, thus maintaining good lubricating properties as grease for a long time. The rust preventive forms rust proof films on the inner surfaces of the bearings, including the inner and outer raceways, rolling elements and retainers of iron, thus preventing rust on the bearings and providing a long working life.

The sulfonate or fatty polyhydric alcohol partial ester, in which alcoholic hydroxyl groups remain, is high in polarity, so that it easily adsorbs to the iron and other metal surface forming the bearings. Also, it can easily attach to the inner surfaces of the bearings because it is dissolved in the lubricating oil contained in the lubricant. Thus, it forms highly rust preventive films.

The ultra-high-molecular-weight polyolefin powder is a powder of polyethylene, polypropylene, polybutene, or a copolymer thereof, or a mixture of these powders.

These powders have a viscometric average molecular weight of $1 \times 10^6 - 5 \times 10^6$ as measured by the viscosity method.

A polyolefin having the above average molecular weight is superior in rigidity and oil retainability to a low-molecular-weight polyolefin, and will scarcely fluidize when heated. The content of such ultra-high-molecular-weight polyolefin in the solid lubricant is 94-1% by weight if no oil exudation inhibitor is added, and 93-1% by weight if it is added. By varying its content, it is possible to adjust the degree of oil separation, tenacity and hardness of the composition to desired levels.

The lubricating grease used in this invention is a lubricating grease thickened by a soap or non-soap. Its base oil or thickeners are not limited in kinds. For example, the grease may comprise lithium soap and diester oil, lithium soap and a mineral oil, sodium soap and mineral oil, aluminum soap and mineral oil, lithium soap and diester mineral oil, non-soap and diester oil, non-soap and mineral oil, non-soap and polyol ester oil, lithium soap and polyol ester oil, or lithium soap and silicone oil.

The lubricating oil used in the invention are not limited but may be any well-known lubricating oil such as mineral oil, synthetic hydrocarbon oil, polyalkylene glycol oil, diester oil, polyol ester oil, phosphoric ester oil, polyphenyl ether oil or silicone oil.

The sulfonate used in this invention may be one represented by $RSO_3.M$ or $(RSO_3)_2M$. Sulfonates expressed by $RSO_3$ include petroleum sulfonates, alkylbenzene sulfonates, and dinonyl naphthalene sulfonates. Metals represented by M include Ba, Ca, Zn and Na.

The fatty polyhydric alcohol partial ester used in the invention is a partial ester of fatty acid having carbon number of 10–20 with a polyhydric alcohol such as sorbitol or pentaerythritol. Such partial esters include sorbitan monoester and pentaerythritol monoester.

Instead of or in combination with such a fatty polyhydric alcohol partial ester, half ester succinate may be used. The half ester succinate used in the invention is a succinic acid in which only one of the carboxylic acids is esterified.

An exudation inhibitor is used in this invention to restrict the oil separation rate of oil exuding onto the oily surface of the solid lubricant, i.e. to restrict the exudation of oil. It may be one containing a solid wax or a low-molecular polyolefin containing a solid wax.

Such solid waxes include plant waxes such as carnauba wax and candelilla wax, animal waxes such as bees wax and insect wax, and petroleum wax such as paraffin wax.

The content of the oil exudation inhibitor in the composition should be 1-50% by weight. The higher this content, the more effectively it is possible to suppress oil separation rate and thus slow down the speed at which oil exudes. But if its content exceeds 50% by weight, the strength of the solid lubricant will decrease.

In order to disperse the ultra-high-molecular-weight polyolefin, fatty polyhydric alcohol partial ester (or half ester succinate), and oil exudation inhibitor in the lubricating grease or oil, after the above materials have been mixed together, the mixture is heated to a temperature higher than the gel point of the ultra-high-molecular-weight polyolefin, e.g. 150°–200° C., and then solidified by cooling. The thus obtained solid lubricant has an oily surface, i.e. a surface onto which oil exudes.

If the lubricating grease is used, the mixture of materials is heated to a temperature higher than the gel point of the ultra-high-molecular-weight polyolefin and lower than the dropping point of the grease.

EXAMPLES

Examples 1–5

The following components were mixed together in the ratios shown in Table 1: ultra-high-molecular weight polyolefin (MIPELON by MITUI PETROCHEMICAL INDUSTRIES, LTD, the main component being a polyethylene, a kind of polyolefin, the viscometric average molecular weight: 2 million), solid wax containing low-molecular polyolefin (SANWAX by SANYO CHEMICAL INDUSTRIES, LTD.), mineral oil or lubricating grease (lithium soap-mineral oil), and barium sulfonate or half ester succinate (made by NIPPON OIL & FAT CO., LTD.). 1.8 g of the thus obtained mixture was sealed in a bearing 6204 with a rubber seal. The bearing was heated at 150°–180° C. in a thermostatic oven for 30 minutes to solidify the mixture.

The solid lubricants obtained were subjected to ① a hardness test and (②) a rust test. The test results are shown in Table 1. ① Hardness test: Hs (spring hardness) was measured under JIS K6301 5.2. ② Rust test: This is a harsher version of a rust test under ASTM D 1743. In this test, the bearings 6204 were run in at 1800 rpm for one minute under a radial load of 98N, 0.5 milliliter of 3% salt water was injected into the bearings, and the bearings were operated again for 3 minutes at 1800 rpm under radial load of 98N. The bearings were then placed in a desiccator. After leaving them in the desiccator for 100 hours at 40° C., rust on the bearings was examined. Specifically, rust was examined by circumferentially dividing the inner race into 23 equal sections and the outer race into 31 equal sections and counting the number of sections where rust was observed. This test was repeated n=4 times. The figures in Table 1 are the 4-time average.

Control Examples 1–3

The following components were mixed together in the ratios shown in Table 1 in exactly the same manner as in Examples 1–5: ultra-high-molecular weight polyolefin (MIPELON by MITUI PETROCHEMICAL INDUSTRIES, LTD.), solid wax containing low-molecular polyolefin (SANWAX by SANYO CHEMICAL INDUSTRIES LTD.) lubricating grease (lithium soap-mineral oil) or mineral oil, and sodium nitrite. The thus obtained mixture was sealed in bearings and solidified in exactly the same manner as with Examples 1–5. The solid lubricants thus obtained were subjected to a hardness test ① and a rust test ②. The test results are shown in Table 1.

As will be apparent from the test results shown in Table 1, Examples 1–5 were substantially equal in hardness (Hs) to Control Examples 1–3, while they showed excellent rust resistance when used in a harsh environment where the bearings were operated under high load of 98N with high-concentration (about 3%) salt water coming into the bearings.

As described above, the solid lubricant for use in bearings according to this invention comprises a lubricating grease or oil, an ultra-high-molecular-weight polyolefin having a predetermined average molecular weight, and a rust preventive such as a sulfonate or a fatty polyhydric alcohol partial ester, with an oil exudation inhibitor optionally added thereto. Such a solid lubricant is less likely to be washed away by water or mud coming into a bearing filled with this solid lubricant. Further, it shows excellent rust resistance in harsh environments where high-concentration salt water comes into the bearing. Such a lubricant can maintain good lubricating properties for the bearing for a long time.

Not all the above-described types of solid lubricants for bearings can be used in food processing machines. Also, it is impossible to add ordinary industrial rust preventives to lubricants for food processing machinery.

Description is now made of solid lubricants which are suitable for use in rolling bearings in food processing machines.

Such solid lubricants have to be less likely to be washed away by water invading bearings. Also, in order for such lubricants to maintain lubricating properties for a long time, they have to be able to prevent the development of rust in the bearings even if salt water invades the bearings.

In order to achieve this object, there is provided a solid lubricant for use in a food processing machine, comprising a mixture of 5-99% by weight of at least one oil selected from the group consisting of liquid paraffins, vegetable oils and animal oils, and 95-1% by weight of an ultra-high-molecular weight polyolefin powder, the mixture being molded in a bearing by heating it to a temperature higher than the gel point of the ultra-high-molecular-weight polyolefin.

Also, there is provided a solid lubricant for use in a food processing machine, comprising a mixture of 5-99% by weight of at least one oil selected from the group consisting of liquid paraffins, vegetable oils and animal oils, and 95-1% by weight of a high-density polyethylene powder, the mixture being molded in a bearing by heating it to a temperature higher than the gel point of the high-density polyethylene.

The abovementioned at least one oil selected form the group consisting of liquid paraffins, vegetable oils and animal oils may be replaced with a grease containing the at least one oil as its base oil. The solid lubricant thus obtained is advantageously sealed in a stainless steel bearing for a food processing machine.

The oil used in the solid lubricant for food processing machines selected from liquid paraffins, vegetable oils and animal oils. Such oils have passed the USDA H-1 standards and the FDA standards as components harmless to humans. Also, it has been confirmed under the FDA standards that ultra-high-molecular-weight polyolefins and high-density polyethylenes are safe if brought into contact with or mixed in foods. Thus, these components can be safely used in solid lubricant for food processing machines.

Since the solid lubricant for food processing machines according to this invention is solid, it is less likely be washed away by water coming into bearings. Its oil content exudes gradually in a proper amount, thus maintaining good lubricating properties, as grease for a long time, The oil in the lubricant forms rustproof films on the inner surfaces of the bearings, including the inner and outer raceways, rolling elements and iron plate retainers, thus, preventing rust on the bearings and extending the life of the bearings.

The ultra-high-molecular-weight polyolefin powder may be a powder of polyethylene, polypropylene, polybutene, or a copolymer thereof, or a mixture of these powders. These powders should have a viscometric average molecular weight of more than 150000.

The high-density polyethylene (HDPE) may be manufactured by polymerizing ethylene under low pressure using a Ziegler catalyst. Its average molecular weight is from 50000 to 150000 (not inclusive).

An ultra-high-molecular-weight polyolefin or a high-density polyethylene having an average molecular weight within this range is superior in its rigidity and oil retainability to a low-density polyethylnene, and will scarcely fluidize when heated.

The content of such ultra-high-molecular-weight polyolefin or high-density polyetheylene in the solid lubricant should be 95-1% by weight. By varying its content, it is possible to adjust the degree of oil separation, tenacity and hardness of the composition to desired levels. That is, the higher the content of ultra-high-molecular-weight polyolefin or high-density polyethylene, the harder the lubricant when it solidifies after the polyolefin or polyethylene has been dispersed at a predetermined temperature.

The abovementioned liquid paraffin may be a known hydrocarbon oil manufactured by highly refining a relatively light lubricating oil fraction by washing with sulfuric acid. It mainly comprise alkyl naphthenes and is listed in the Japanese pharmaceutical codex as a medicated liquid paraffin. Also, this paraffin is equivalent to paraffins listed in the U.S., British and German pharmaceutical codex as food additives.

The vegetable oil used in the invention may be known natural oil harmless to humans. Such oils include camellia oil, olive oil, peanut oil, castor oil, and rapeseed oil.

The animal oil use in the invention may be a natural oil harmless to humans. Such oils include chrysalis oil cattle leg oil, lard and marine animal oils as sardine oil and herring oil.

The grease containing as its base oil, at least one oil selected from liquid paraffins, vegetable oils and animal oils may further contain thickeners such as aluminum composite soap, calcium hydrostearate, polyurea or clay, and may be a commercially available grease that meets the FDA or USDA standards.

In order to disperse the lubricating grease or oil into the ultra-high-molecular-weight polyolefin or high-density polyethylene, the mixture of these components are heated to a temperature higher than the gel point of the ultra-high molecular-weight polyolefin or the high-density polyethylene. Then, the mixture is cooled to solidify to give a solid lubricant having an oily surface, namely, a surface on which the oil inside exudes.

If the lubricating grease is used, the mixture is heated to a temperature higher than the gel point of the ultra-high-molecular-weight polyolefin and lower than the dropping point of the grease.

Reference Examples 1–6

The following components were mixed together in the ratios shown in Table 2: ultra-high-molecular weight polyolefin (MIPELON by MITUI PETROCHEMICAL INDUSTRIES, LTD., the main component being a polyethylene, a kind of polyolefin, the viscometric average molecular weight: 2 million), high-density polyethylene, liquid paraffine, olive oil as a vegetable oil, lard as an animal oil, grease I for food processing machines (liquid paraffin thickened with aluminum composite soap), and grease II for food processing machines (liquid paraffin thickened with polyurea). About 1.8 g of the thus obtained mixture was sealed in a stainless steel (SUS440c) bearing 6204 with a rubber seal. The bearing was heated at 150°–180° C. in a thermostatic oven for 30 minutes to solidify the mixture.

The solid lubricants obtained were subjected to the same hardness test ① and rust test ② as above. The test results are shown in Table 2.

Reference Example 7

Ultra-high-molecular-weight polyolefin and grease I were mixed together in the ratio shown in Table 1, and 1.8 g of the thus obtained mixture was sealed in a bearing 6204 (SUJ-2) with a rubber seal. This lubricating composition was solidified in exactly the same manner as in Examples 1–6.

The solid lubricants obtained were subjected to the same harness test (①) and rust test (②) as above. The test results are shown in Table 2.

Reference Example 8

20 wt % of ultra-high-molecular weight polyolefin and 80 wt % of grease I were mixed together, and 3.2 g of the mixture was sealed in a bearing 6206(SUJ-2). This lubricating composition was solidified in exactly the same manner as in Examples 1–7.

The solid lubricant obtained was tested for durability by rotating the bearing at 3000 rpm while applying a radial load of 500 kgf. The lubricant showed good lubricating properties even after 600-hour operation, while the calculated life of the lubricant was 355 hours.

Reference Examples 9–13

The following components were mixed together in the ratios shown in Table 2: ultra-high-molecular weight polyolefin, high-density polyethylene, mineral oil, synthetic hydrocarbon oil, grease III for food processing machines (mineral oil thickened with aluminum composite soap, and grease IV for food processing machines (synthetic hydrocarbon oil thickened with polyurea). About 1.8 gram of the thus obtained mixture was sealed in a stainless steel (SUS 440C) bearing 6204 with a rubber seal.

The bearing was heated at 150°–180° C. in a thermostatic oven for 30 minutes to solidify the mixture. The solid lubricants obtained were subjected to hardness and rust tests in the same manner as in Example 1–6. The test results are shown in Table 2.

Reference Control Example 1

1.8 grams of grease I was sealed in a bearing 6204 (SUJ-2). The solid lubricant obtained was subjected to the hardness ① and ② rust test. The test results are shown in Table 2.

As will be apparent form Table 2, the grease leaked less from the lubricant of Reference Examples 1–8 than the lubricant of Control Example 1 and showed excellent rust proofness and lubricating durability even when the bearings was used in a harsh environment where salt water invades the bearing.

The solid lubricant for use in food processing machines is harmless to humans, less likely to be washed away by water coming into the bearing, and shown excellent rust proofness even when the bearing is use in an environment where salt water comes into the bearings. Such a lubricant can keep lubricating bearings, of a food processing machine for a long period of time.

TABLE 1

| | Number | | | | | | | |
|---|---|---|---|---|---|---|---|---|
| | Example | | | | | Comparative example | | |
| Item | 1 | 2 | 3 | 4 | 5 | 1 | 2 | 3 |
| Content (wt %) | | | | | | | | |
| Ultra-high-molecular-weight polyolefin | 20 | 20 | 20 | 34 | 34 | 20 | 20 | 34 |
| Solid wax containing low-molecular polyolefin | 6 | 6 | 6 | — | — | 6 | 6 | — |
| Lithium soap-mineral oil grease | 72 | 73 | 73 | — | — | 74 | 73 | — |
| Mineral oil | — | — | — | 65 | 65 | — | — | 66 |
| Barium sulfonate | 2 | 1 | — | 1 | — | — | — | — |
| Half ester succinate | — | — | 1 | — | 1 | — | — | — |
| Solidium nitrite | — | — | — | — | — | — | 1 | — |
| Hardness (Hs) | 80 | 81 | 81 | 82 | 82 | 82 | 82 | 83 |
| Rust test evaluation | 1 | 3 | 5 | 14 | 6 | 54 | 18 | 54 |

TABLE 2

| | Number | | | | | | | | | | | | | |
|---|---|---|---|---|---|---|---|---|---|---|---|---|---|---|
| | Reference example | | | | | | | | | | | | | |
| Item | 1 | 2 | 3 | 4 | 5 | 6 | 7 | 8 | 9 | 10 | 11 | 12 | 13 | *** |
| Content (wt %) | | | | | | | | | | | | | | |
| Ultra-high molecular-weight polyolefin | 20 | 20 | 20 | 20 | 20 | — | 20 | 20 | 30 | 30 | 30 | 30 | — | — |
| High-density polyethylene | — | — | — | — | — | 20 | — | — | — | — | — | — | 20 | — |
| Liquid paraffine | — | — | 80 | — | — | — | — | — | — | — | — | — | — | — |
| Vegetable oil | — | — | — | 80 | — | — | — | — | — | — | — | — | — | — |
| Animal oil | — | — | — | — | 80 | — | — | — | — | — | — | — | — | — |
| Mineral oil | — | — | — | — | — | — | — | — | 70 | — | — | — | — | — |
| Synthetic hydrocarton oil | — | — | — | — | — | — | — | — | — | 70 | — | — | — | — |
| Grease I for food processing machines | — | 80 | — | — | — | 80 | 80 | 80 | — | — | — | — | — | 100 |
| Grease II for food processing machines | 80 | — | — | — | — | — | — | — | — | — | — | — | — | — |
| Grease III for food processing machines | — | — | — | — | — | — | — | — | — | — | 70 | — | 80 | — |
| Grease IV for food processing machines | — | — | — | — | — | — | — | — | — | — | — | 70 | — | — |
| Material of bearing | SUS* | SUS* | SUS* | SUS* | SUS* | SUS* | SUJ2 | SUJ2 | SUS* | SUS* | SUS* | SUS* | SUS* | SUJ2 |
| Hardness (Hs) | 55 | 37 | 55 | 60 | 60 | 20 | 37 | — | 75 | 73 | 76 | 70 | 25 | 0** |
| Rust test evaluation | 0 | 0 | 0 | 0 | 0 | 0 | 23 | — | 0 | 0 | 0 | 0 | 0 | 47 |

SUS* = SUS440C
**Consistency of grease: 280
***Reference comparative example 1

What is claimed is:

1. A solid lubricant for rolling bearings comprising a mixture of 72-98% by weight of a lubricating grease, and 20-1% by weight of powder of polyethylene having an average molecular weight of 150000 or more, and an oil-soluble rust preventive in the form of a sulfonate or a fatty polyhydric alcohol partial ester, said mixture being heated to a temperature higher than the gel point of said polyethylene and lower than the dropping point of said lubricating grease.

2. A solid lubricant for rolling bearings comprising a mixture of 72-97% by weight of a lubricating grease, 20-1% by weight of powder of polyethylene having an average molecular weight of 150000 or more, and 1-50% by weight of solid wax containing low-molecular weight polyolefin, and an oil soluble rust preventive in the form of a sulfonate or a fatty polyhydric alcohol partial ester, said mixture being heated to a temperature higher than the gel point of said polyethylene and lower than the dropping point of said lubricating grease.

3. A solid lubricant according to claim 1, wherein the rust preventive is barium sulfonate.

4. A solid lubricant according to claim 1, wherein the rust preventive is a half ester succinate.

5. A solid lubricant according to claim 2, wherein the rust preventive is barium sulfonate.

6. A solid lubricant according to claim 2, wherein the rust preventive is a half ester succinate.

* * * * *